April 25, 1939.  W. SCHMIDT  2,155,565
PATTERN FOR KALEIDOSCOPIC DEVICES
Filed March 26, 1938  3 Sheets-Sheet 1
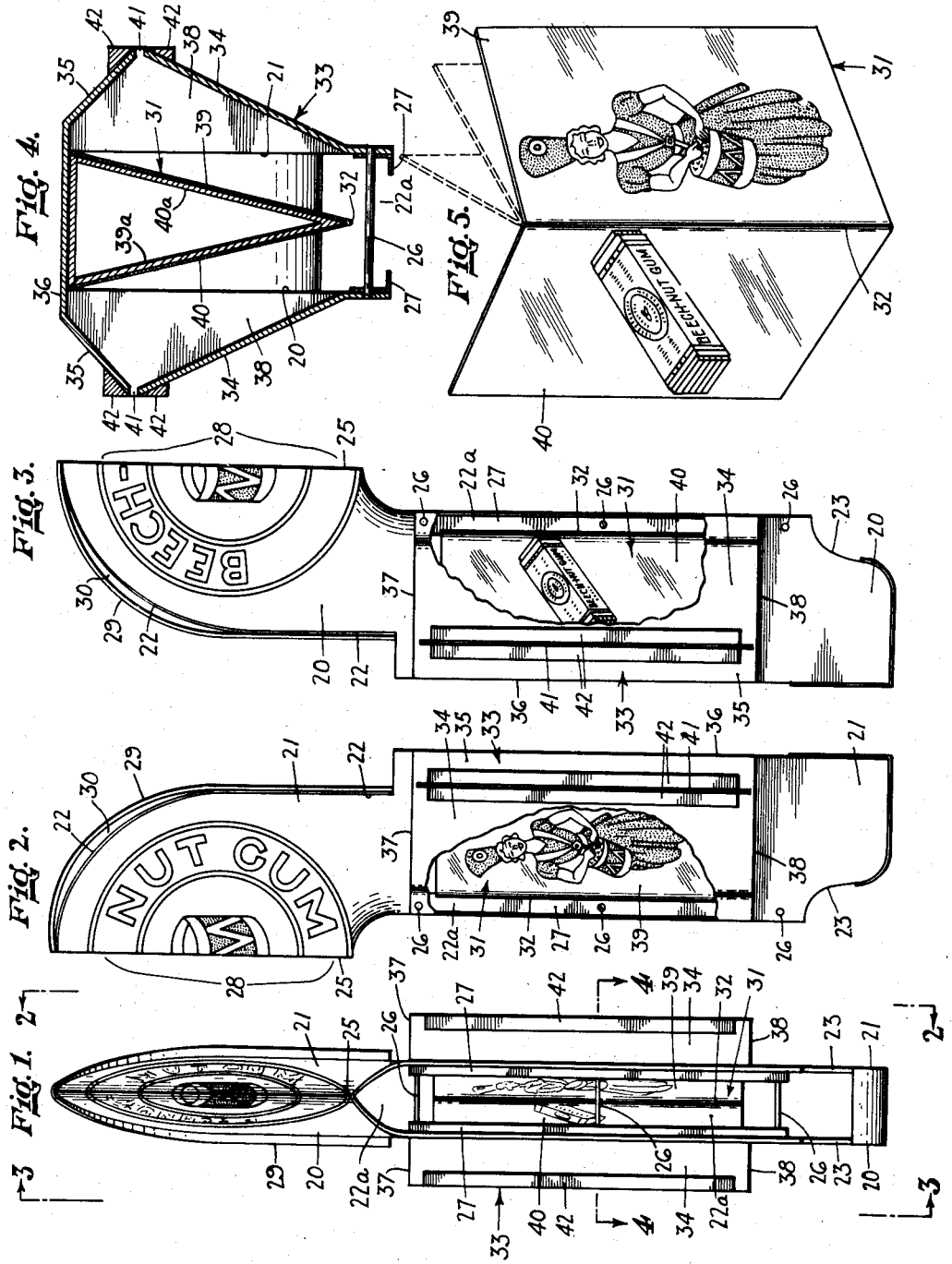
INVENTOR
WILHELM SCHMIDT
BY
Richards & Geier
ATTORNEYS

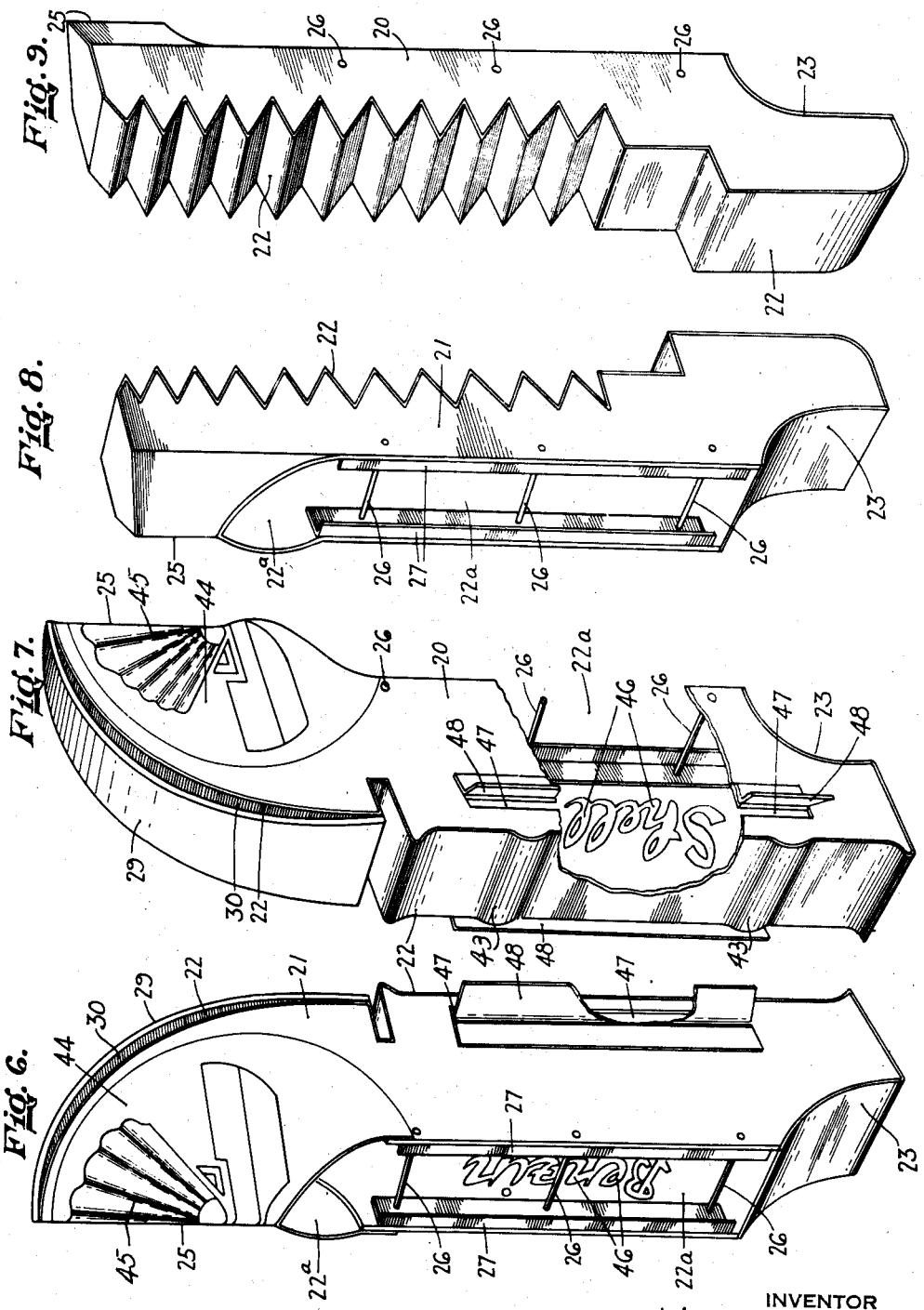

April 25, 1939.     W. SCHMIDT     2,155,565
PATTERN FOR KALEIDOSCOPIC DEVICES
Filed March 26, 1938     3 Sheets-Sheet 3
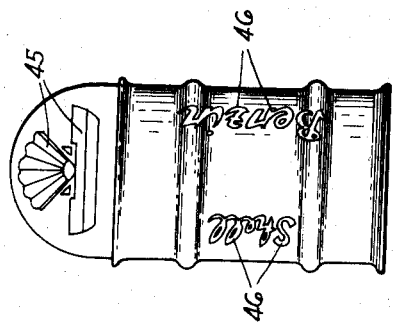
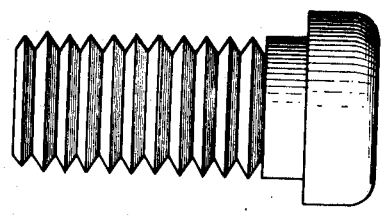
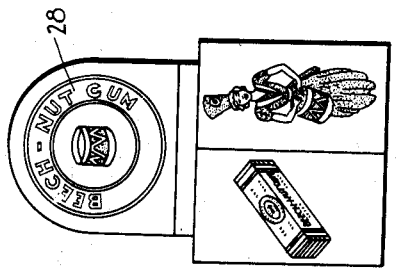
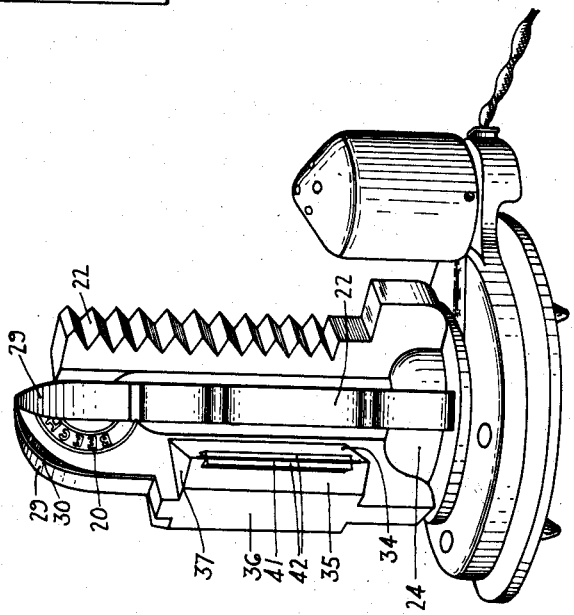
INVENTOR
WILHELM SCHMIDT
BY
Richards & Geier
ATTORNEYS Patented Apr. 25, 1939

2,155,565

UNITED STATES PATENT OFFICE 2,155,565

PATTERN FOR KALEIDOSCOPIC DEVICE

Wilhelm Schmidt, Berlin-Schmargendorf, Germany, assignor to Erika Annemarie Mulert, New York, N. Y.

Application March 26, 1938, Serial No. 198,245

17 Claims. (Cl. 40—77)

This invention relates to kaleidoscopic devices and the like and is a continuation in part of my application Serial Number 66,479, filed February 29, 1936. It relates more particularly to the individual patterns or displays used in connection with the apparatus described therein to produce the images or optical illusions desired.

One of the principal objects of the invention is to provide a pattern or display of the character indicated which, upon sufficiently rapid motion thereof, will bring into view a three dimensional image of the object to be displayed.

Still a further object is to provide a pattern or display for kaleidoscopic devices, advertising apparatus, toys and the like, which, in addition to the image of the object to be displayed or advertised, will bring into view appropriate legendary or advertising matter when the patterns are moved with sufficient frequency.

Another object is to provide a luminous pattern or display for devices of the character referred to, which may be easily attached, detached or exchanged on a movable support.

Still a further object is to provide a series of displays of this nature which when moved and successively illuminated will bring into view a sequence of images or pictures with or without accompanying explanatory matter.

Other objects and advantages will become apparent as the specification proceeds and when considered in conjunction with the accompanying drawings which show preferred embodiments of the inventive concept. It will be understood, however, that these illustrations are submitted by way of example only and it will be clear that the invention is not limited thereto but may be embodied in other forms within the scope of the appended claims:

In the drawings:

Figure 1 is a front elevation of a display or pattern according to the invention, Figure 2 is a view taken along the line 2—2 of Figure 1 showing portion of the outside covering broken away;

Figure 3 is a view taken along the line 3—3 of Figure 1 also with a portion broken away;

Figure 4 is a section along the line 4—4 of Figure 1;

Figure 5 is a perspective view of the advertising matter arranged within the display shown in Figures 2 and 3;

Figure 6 is a perspective view of another display or pattern according to the invention;

Figure 7 is a perspective view of the same display taken from the side opposite to that of Figure 6 and having portion broken away to show the internal advertising matter;

Figures 8 and 9 are perspective views of still another display taken from opposite sides;

Figure 10 is a perspective view showing the three patterns or designs illustrated in Figures 1 to 9, inclusive mounted together on the apparatus for rotation about a central support.

Figure 11 is a plan view of the image that will be brought into view when the pattern shown in Figures 1 to 4, inclusive, is illuminated and rotated on the apparatus shown in Figure 10;

Figures 12 and 13 are plan views of the images that will be brought into view when the patterns or displays illustrated in Figures 6 to 9 are rotated and illuminated.

It will be understood that the invention is based on the kaleidoscopic or cinematographic principle that if the same image is brought into view with sufficient frequency it will appear stationary. If the image describes a rotary path, it will appear steadily before the eye as would a series of images of the same object moved in a straight course before the eye.

Referring in more detail to the drawings, in which the same reference characters indicate same or analogous parts, the display or pattern comprises a screen preferably in the nature of a hollow casing defined by lateral walls 20 and 21 and the outer edge wall 22. The opposite edges of the lateral walls 20 and 21 are recessed to form a window or opening 22a which conforms to the vertical frame of the apparatus upon which the patterns are mounted for rotation and which has been described in detail in my co-pending applications Serial Numbers 66,479, filed February 29, 1936, and 198,244, filed March 26, 1938. In other words, the opening 22a is so arranged that the pattern will fit snugly over the frame and will become internally illuminated by the light source within the frame when the window of the surrounding shield is directly in front of the opening 22a. The lower portion of the lateral walls are also recessed at 23 to fit over the casing 24 of the apparatus as shown in Figure 10 of the drawings.

The lateral walls 20 and 21 preferably meet above the opening 22a in a substantially sharp edge 25 to permit other patterns to be positioned radially on the rotary frame of the apparatus. The edge 25 is directly in the center of the circle which the pattern describes when rotated on the apparatus and thus forms the theoretical axis about which it revolves. It will be understood, however, that such central wall or edge does not constitute an essential part of the invention. Its existence or non-existence depends on the character of the image to be produced. Thus, while it is necessary in the patterns shown in Figures 1 to 7, inclusive, to complete the images shown in Figures 11 and 12, it may be dispensed with in the pattern shown in Figures 8 and 9 as the image produced thereby, and which is shown in Figure 13, has no design apart from the object itself.

The lateral walls 20 and 21 are spaced apart and the opening 22a braced by means of ribs 26. Rails 27 are provided along the vertical edges of the opening which will engage corresponding channels on the rotary frame of the apparatus. In this manner the patterns may easily be exchanged on the apparatus.

The opaque portions of the pattern, such as the lateral walls, are preferably made of cardboard or some similar light material. These opaque portions are provided with transparent areas of parchment or vellum paper arranged according to the image to be produced. Thus the opposing lateral walls of the patterns shown in Figures 1 to 5, inclusive, have semicircular transparent inserts 28, each embodying a component half of the circular display shown in Figure 11. The various features of the display may be brought out distinctly by using transparent material of contrasting colors selected according to a particular purpose. Thus the lettering may be white on a colored background or vice versa, and the design on the drum may be brought out in similar manner. The outer wall 22 may be made of differently colored transparent material and covered by an opaque shield 29 which is spaced slightly from the transparent wall 22 leaving a barely noticeable slit 30 through which the colored light will be diffused.

Upon rotation of this luminescent pattern, the image of the component halves will appear on diametrically opposite sides of the apparatus shown in Figure 10. Because of rotation about a vertical axis defined by the edge 25, and which also defines the diameter of the circular transparent insert, the image of the two halves will come together to form a continuous complete design. The colored light diffused through the slit 30 will produce an arc or halo about the display to set it off more clearly against the background.

The image thus produced may be made more effective by arranging within the pattern a card or a folder generally indicated at 31 and shown in detail in Figure 5, containing additional explanatory or advertising matter. This card is preferably folded along the edge 32 and inserted through the opening 22a in the box forming part of the pattern and which is generally indicated at 33. This box is defined by the converging side walls 34 and 35, the front wall 36 and the top and bottom walls 37 and 38, respectively, all of which are made of opaque material. The card 31 may be inserted either with the edge 32 facing the opening 22a or the outer wall 22 and the sides 39 and 40 may be provided with different or harmonizing display material or pictures.

The box 31 is provided with a slit 41 at diametrically opposite points through which the illuminated display card will be visible. The slit should of course be sufficiently restricted so that the eye of the observer will receive the impression for merely a fraction of a second when the pattern, together with the box, is rotated with the speed most suitable for bringing the other image into view. The slit 41 is preferably arranged at the juncture between the converging side walls 34 and 35. In this manner, the walls together with the slit will form a funnel for the light so that one entire side of the display card 31 will be visible through the slit.

The slit 41 may be reinforced by the frame 42.

When the pattern together with the box 33 is rotated in the manner described, the impulses received by the eye of the observer in rapid succession will then form a continuous image, as shown in Figure 11 of the drawings. It will be understood that the invention is not restricted to a folded display card. The same effects can be produced simply by bending the card in an arc shape. It will also be understood that the box in which this card is enclosed does not necessarily have to have the construction described hereinbefore in detail as long as it is provided with a slit through which the display matter on the card is visible.

In the pattern shown in Figures 6 and 7 of the drawings, the outer wall 22 is provided with a transparent area having the configuration of the outline of a gasoline drum. The bands 43 of the drum may be brought out by transparent material of a contrasting color. The upper portion of the pattern is provided with a circular transparent insert 44 in which the design 45 may be set off by transparent material of contrasting color. Like the pattern shown in Figures 1 to 5, each lateral side embodies one component half of the design, so that when the illuminated pattern is rotated, the design will appear complete as shown in Figure 12. The luminescent outline of the drum will in addition produce a three dimensional image thereof.

The effect of this image may also be improved by arranging on the interior of the opposite walls the legendary matter 46 which is brought into view through the slit 47 when the pattern is rotated, in the same as in the pattern shown in Figures 1 to 5. Guide shields 48 may be provided to confine the view to the legend on the opposite sides. This shield takes the place of the converging walls of the box 31 of the former pattern. This box may be dispensed with in this pattern in view of the relatively small area to be brought into view. When the illuminated pattern shown in Figures 6 and 7 is rotated a three dimensional luminescent image of the drum will appear within which the legendary matter will appear as shown in Figure 12.

The pattern shown in Figures 8 and 9 is of a somewhat simplified construction since its only purpose is to produce a three dimensional image of the object, in this case a screw. This may be accomplished by making the entire outer wall 22 transparent and giving the configuration of one-half of the outline of the screw. When rotated, the illuminated pattern will then produce the image shown in Figure 13.

It will be clear from the foregoing description, that the invention may be used to produce images and designs of various nature and character and by rotating and successively illuminating a sequence of patterns, the pictures or images be made to appear moving or animated. Thus the invention is capable of numerous adaptions and modifications may be made within the scope of the following claims.

What is claimed is:

1. A pattern for a kaleidoscopic device, comprising a casing of opaque material, transparent areas in the walls of said casing, arranged thereon according to the design to be produced, whereby said pattern when illuminated and rotated rapidly will produce a luminescent image of the design.

2. In a kaleidoscopic device having a rotatable frame and a light source within said frame, a casing of opaque material mounted for internal illumination on said frame, transparent areas in the walls of said casing arranged thereon according to the design to be produced, whereby said casing when rotated rapidly will produce a luminescent image of the design.

3. In a kaleidoscopic device having a rotatable frame and a light source within said frame, a casing of opaque material radially mounted for internal illumination on said frame, transparent areas in the walls of said casing comprising not more than one-half of the outline and design of object the image of which is to be produced, whereby said casing when rotated rapidly will produce a luminescent complete image of the object and design.

4. In a kaleidoscopic device having a rotatable frame and a light source within said frame, a casing of opaque material having side and end walls radially mounted for internal illumination on said frame, the peripheral end wall of said radially mounted casing having a transparent area conforming to one-half of the outline of the object the image of which is to be produced, whereby a three dimensional image of the object will be produced when said casing is rotated.

5. In a kaleidoscopic device having a rotatable frame and a light source within said frame, a casing of opaque material radially mounted for internal illumination on said frame, transparent areas in the walls of said casing embodying one-half of the outline of the design to be produced, said areas extending to the central axis about which said frame and said casing is rotated, whereby an uninterrupted image of the complete design will be brought into view when said casing is rotated.

6. In a kaleidoscopic device having a rotatable frame and a light source within said frame, a casing of opaque material having side and end walls radially mounted for internal illumination on said frame, the peripheral wall of said radially mounted casing having a translucent area conforming to one-half of the outline of the object the image of which is to be produced, additional translucent areas in the side walls of said casing embodying one-half of the outline of the design to be produced within said object, said last-mentioned areas extending to the central axis about which said frame and said casing is rotated whereby an uninterrupted three-dimensional luminescent image of the object and the complete design will be brought into view when said casing is rotated.

7. In a kaleidoscopic device having a rotatable frame and a light source within said frame, a casing of opaque material radially mounted for internal illumination on said frame and having a longitudinal slot, display means mounted within said casing to be viewed through said longitudinal slot whereby a continuous luminescent image of said display means will appear when said casing is rotated.

8. In a kaleidoscopic device having a rotatable frame and a light source within said frame, a casing of opaque material radially mounted for internal illumination on said frame having a longitudinal slot on opposite sides of said casing, means for carrying advertising matter mounted within said casing for component parts to be viewed through said opposite longitudinal slots whereby a continuous and complete luminescent image of said advertising matter will be brought into view when said casing is rotated.

9. In a kaleidoscopic device having a rotatable frame and a light source within said frame, a casing of opaque material radially mounted for internal illumination on said frame, a projection box for advertising matter mounted on said casing having a projection slot at opposite sides thereof, means for carrying the advertising matter mounted thereon so that component parts thereof may be viewed through said projection slots whereby a continuous luminescent image of said advertising matter will be brought into view when said casing is rotated.

10. In a kaleidoscopic device having a rotatable frame and a light source within said frame, a casing of opaque material radially mounted for internal illumination on said frame, having a longitudinal projection slot, means for carrying advertising matter mounted within said casing to be viewed through said projection slot, translucent areas in the walls of said casing arranged thereon according to the design to be produced whereby a luminescent image of said advertising matter and said design will be brought into view when said casing is rotated.

11. In a kaleidoscopic device having a rotatable frame and a light source within said frame, a casing of opaque material having side and end walls radially mounted for internal illumination on said frame, the peripheral wall of said radially mounted casing having a translucent area conforming to one-half of the outline of the object the image of which is to be produced, additional translucent areas in the side walls of said casing each embodying one-half of the outline of the design to be produced and extending to the central axis about which said frame and said casing is rotated, a longitudinal slot on opposite sides of said casing, means for carrying advertising matter mounted within said casing so that component parts thereof may be viewed through said slots whereby an image of the advertising matter within a three dimensional luminescent image of said object together with a luminescent complete image of said design will be brought into view when said casing is rotated.

12. A pattern for a kaleidoscopic device comprising a casing of opaque material, translucent areas in the opposite walls of said casing each comprising one-half of the design to be produced whereby said casing when illuminated and rotated rapidly will produce a luminescent complete image of said design.

13. A pattern for a kaleidoscopic device comprising an open casing of opaque material having side and end walls, the end wall of said casing having a translucent area conforming to one-half of the outline of the object the image of which is to be produced and the opposing side walls having additional translucent areas each comprising one-half of a selected design whereby said casing when illuminated and rotated rapidly about a central support will produce a luminescent three-dimensional image of the object together with an image of said design.

14. A pattern for a kaleidoscopic device comprising an open casing of opaque material having side and end walls and means for mounting the same radially on a central rotatable support, a longitudinal slot in the opposing side walls of said casing, means for carrying advertising matter mounted within said casing the component parts thereof to be viewed through said opposing slots whereby said casing when illuminated and rapidly rotated about said central support will bring into view a complete and continuous image of said advertising matter.

15. A pattern for a kaleidoscopic device comprising an open casing of opaque material having side and end walls and means for mounting the same on a central rotatable support, the outer end wall of said casing having translucent area conforming to one-half the outline of the object the image of which is to be produced, additional translucent areas in the side walls of said casing each embodying one-half of the selected design, a longitudinal projection slot in the side walls of said casing, means for carrying advertising matter mounted within said casing for component parts thereto to be viewed through said projection slots whereby an image of said advertising matter within a three-dimensional luminescent image of the object together with a complete image of said design will be brought into view when said casing is illuminated and rotated rapidly about said central support.

16. A pattern for a kaleidoscopic device comprising a screen of opaque material, transparent areas in said screen arranged thereon according to the design to be produced whereby said pattern when illuminated and moved with sufficient speed will produce a luminescent image of the design.

17. In a kaleidoscopic device having a light source, a screen of opaque material movable relative to said light source and adapted to be illuminated thereby, transparent areas in said screen arranged thereon according to the design to be produced whereby said screen when moved with sufficient speed relative to said light source will produce a luminescent image of the design.

WILHELM SCHMIDT.